United States Patent [19]

Hildebrecht

[11] 4,100,987
[45] Jul. 18, 1978

[54] CRADLE FOR A DIFFERENTIAL

[75] Inventor: Harold V. Hildebrecht, Cleveland, Ohio

[73] Assignee: Towmotor Corporation, Mentor, Ohio

[21] Appl. No.: 795,038

[22] Filed: May 9, 1977

[51] Int. Cl.² ............................................. B60K 17/16
[52] U.S. Cl. .................................... 180/75; 180/54 E; 180/88
[58] Field of Search ............... 180/70 R, 75, 88, 54 E, 180/62; 74/607; 187/9 R; 280/106 R; 214/674

[56] References Cited

U.S. PATENT DOCUMENTS

| | | | |
|---|---|---|---|
| 2,256,314 | 9/1941 | Dunham | 180/54 E |
| 2,471,429 | 5/1949 | Hawkins | 180/54 E |
| 3,099,166 | 7/1963 | Schou | 74/359 |
| 3,207,249 | 9/1965 | Singer | 180/54 E |
| 3,662,849 | 5/1972 | Bostad | 180/54 E |
| 3,889,782 | 6/1975 | Geis | 180/54 E X |
| 3,963,089 | 6/1976 | Crawford | 180/75 |

Primary Examiner—Joseph F. Peters, Jr.
Assistant Examiner—Terrance L. Siemens
Attorney, Agent, or Firm—Wegner, Stellman, McCord, Wiles & Wood

[57] ABSTRACT

A lift truck including a vehicle frame having spaced side frame members, wheels on the frame including two final drive units, one on each side of the frame, and secured thereto, a differential mounted on the frame and connected to both the final drive units, the differential including a housing having opposed, outwardly directed drive train component tunnels extending to a corresponding one of the final drive units, and a pair of cradles on opposite sides of the frame, each having a generally upwardly facing differential tunnel supporting surface, each such surface having substantially the same shape as the adjacent part of the corresponding tunnel and being slightly larger in size to support the differential during assembly of final drive units to the frame and to the differential while allowing minimal shifting thereof to achieve alignment of the components during such assembly.

11 Claims, 4 Drawing Figures

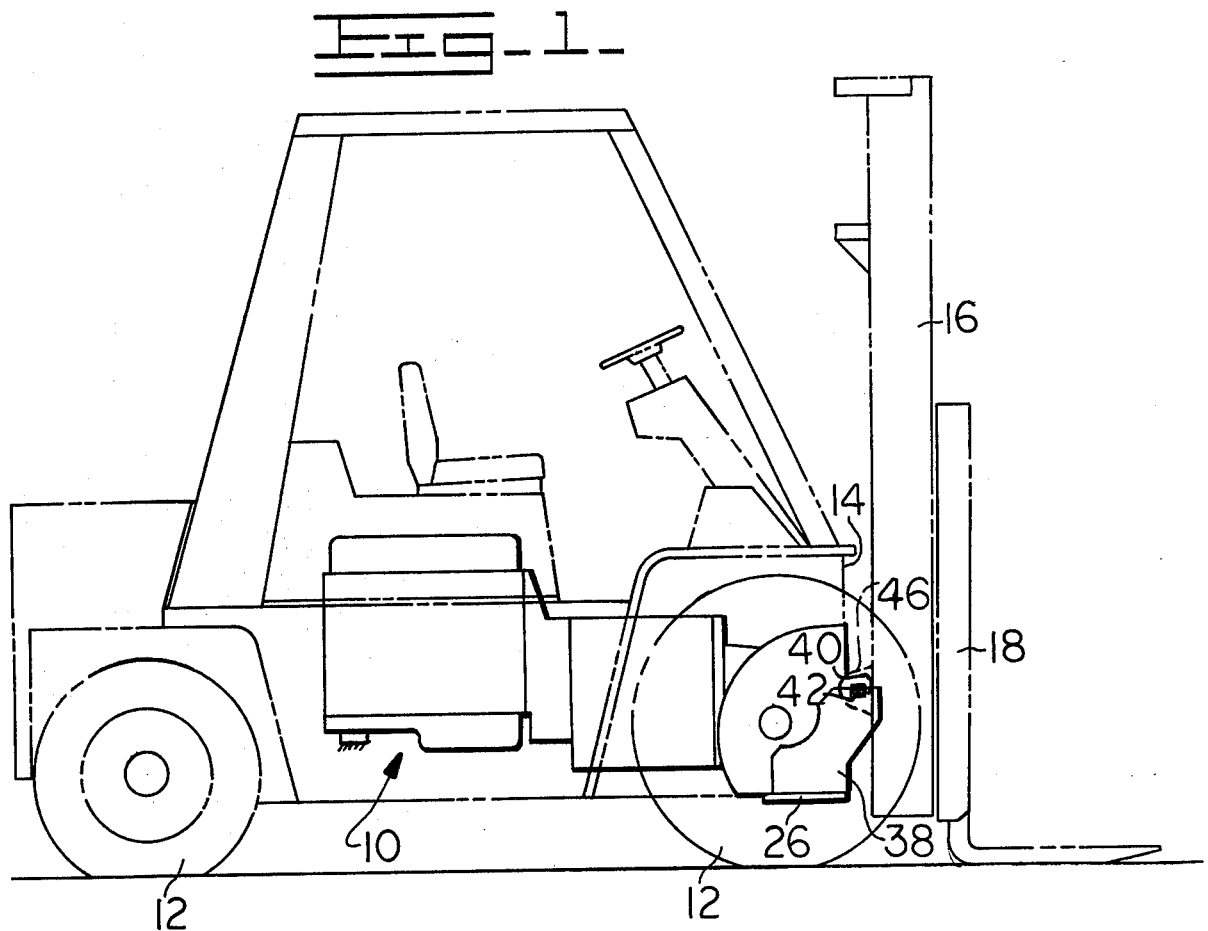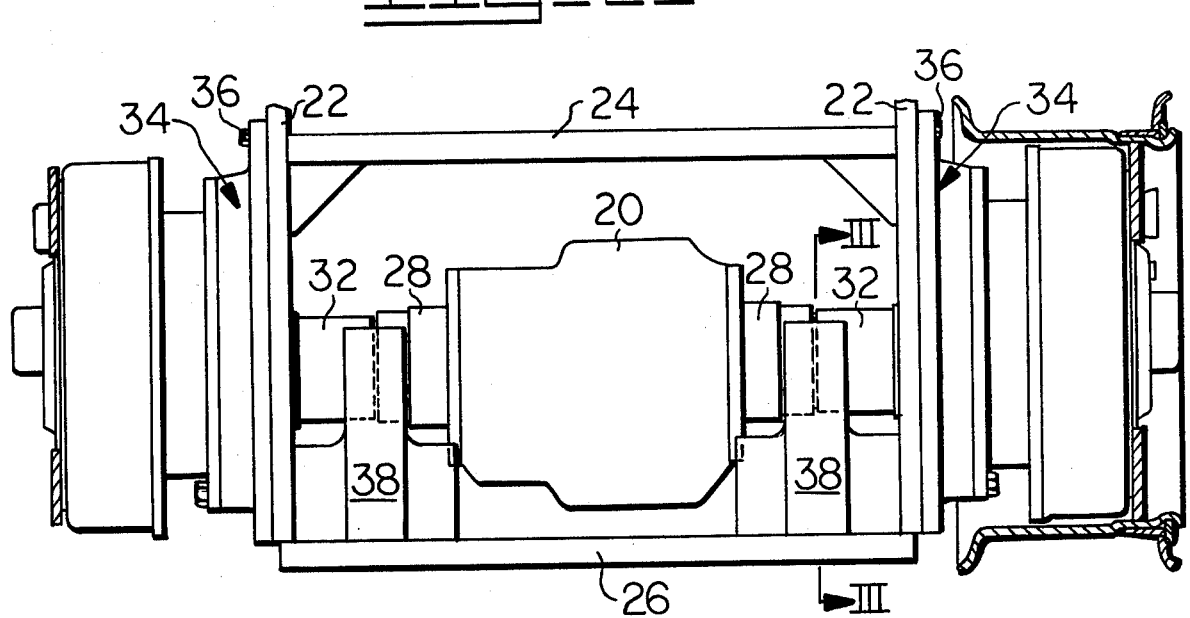

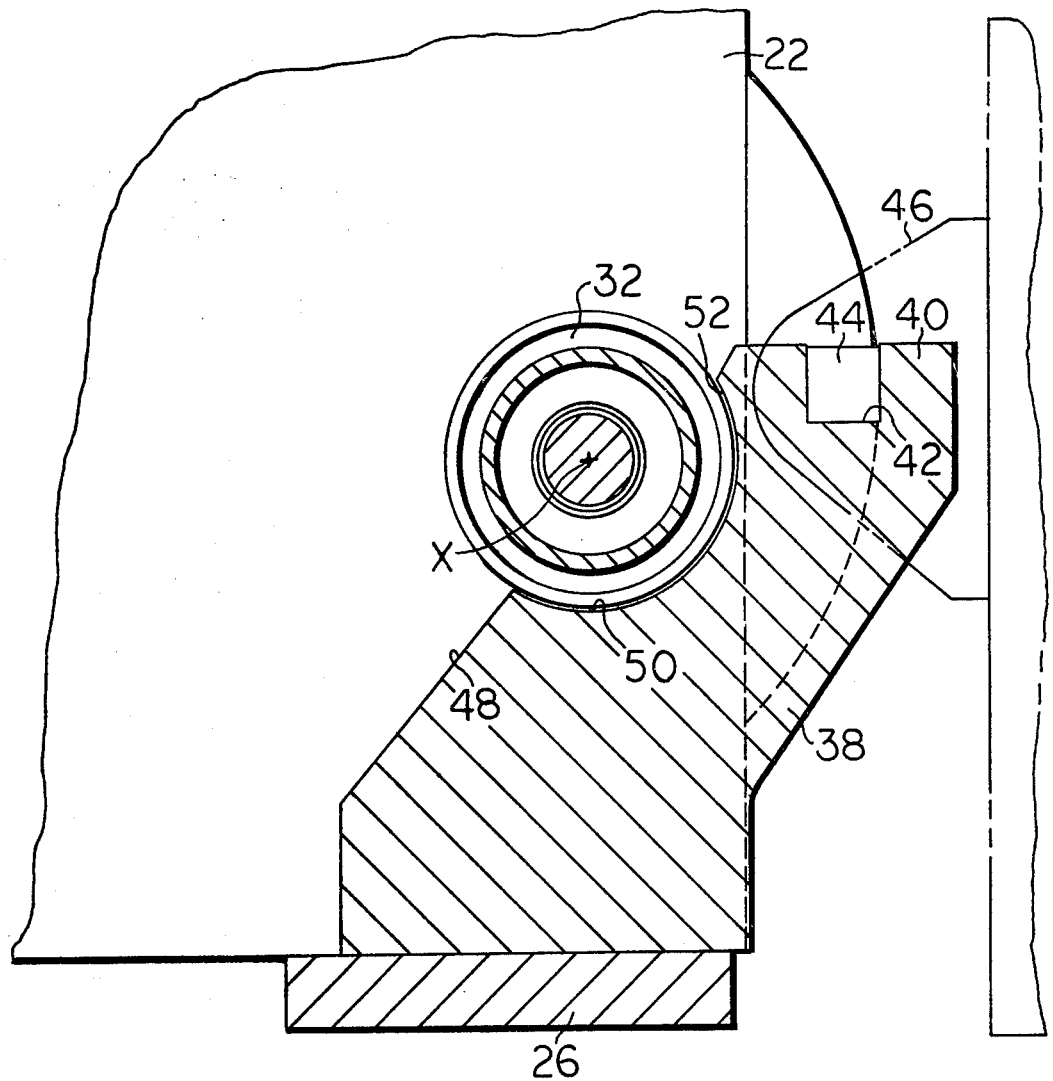
FIG_3_

CRADLE FOR A DIFFERENTIAL

BACKGROUND OF THE INVENTION

This invention relates to vehicles and, more specifically, to vehicle elements that may be advantageously employed during assembly of other vehicle components as, for example, a differential and final drive units.

In a wide variety of industries, labor costs are increasing at a far greater rate than material or parts costs. Consequently, it is highly desirable to eliminate as much manual labor as possible or, at the very least, reduce the amount of time required for a laborer to perform a given task.

The manufacture of vehicles is one area where labor savings is particularly desirable. In one specific area of vehicle manufacture, considerable time may be consumed in assembling parts where alignment is concerned. This area is that, for example, where differentials are to be assembled to final drive units in vehicles wherein the final drive unit is secured to the frame and the differential housing is not to be subject to the loads of the vehicle.

SUMMARY OF THE INVENTION

The present invention is directed to overcoming one or more of the above problems.

According to the present invention, there is provided a vehicle including a frame having spaced side frame members. Wheels are disposed on the frame and there are provided two final drive units, one on each side of the frame, and which are secured thereto. A differential is mounted on the frame and is connected to both the final drive units. The differential includes a housing having opposed, outwardly directed drive train component tunnels extending to a corresponding one of the final drive units. A pair of cradles are supported on the frame at opposite sides thereof and each has a generally upwardly facing, differential tunnel supporting surface. Each such surface has substantially the same shape as the adjacent part of the corresponding tunnel and is slightly larger in size to support the differential during assembly, while allowing minimal shifting thereof to achieve alignment of the parts during assembly.

Other objects and advantages will become apparent from the following specification taken in connection with the accompanying drawings.

DESCRIPTION OF THE DRAWINGS

FIG. 1 is a side elevation of a lift truck embodying the invention;

FIG. 2 is an enlarged, elevational view of part of the vehicle frame, essentially an elevation illustrating a differential and other drive train components;

FIG. 3 is an enlarged, vertical section taken approximately along the line 3—3 in FIG. 2.

DESCRIPTION OF THE PREFERRED EMBODIMENT

Figure 4:
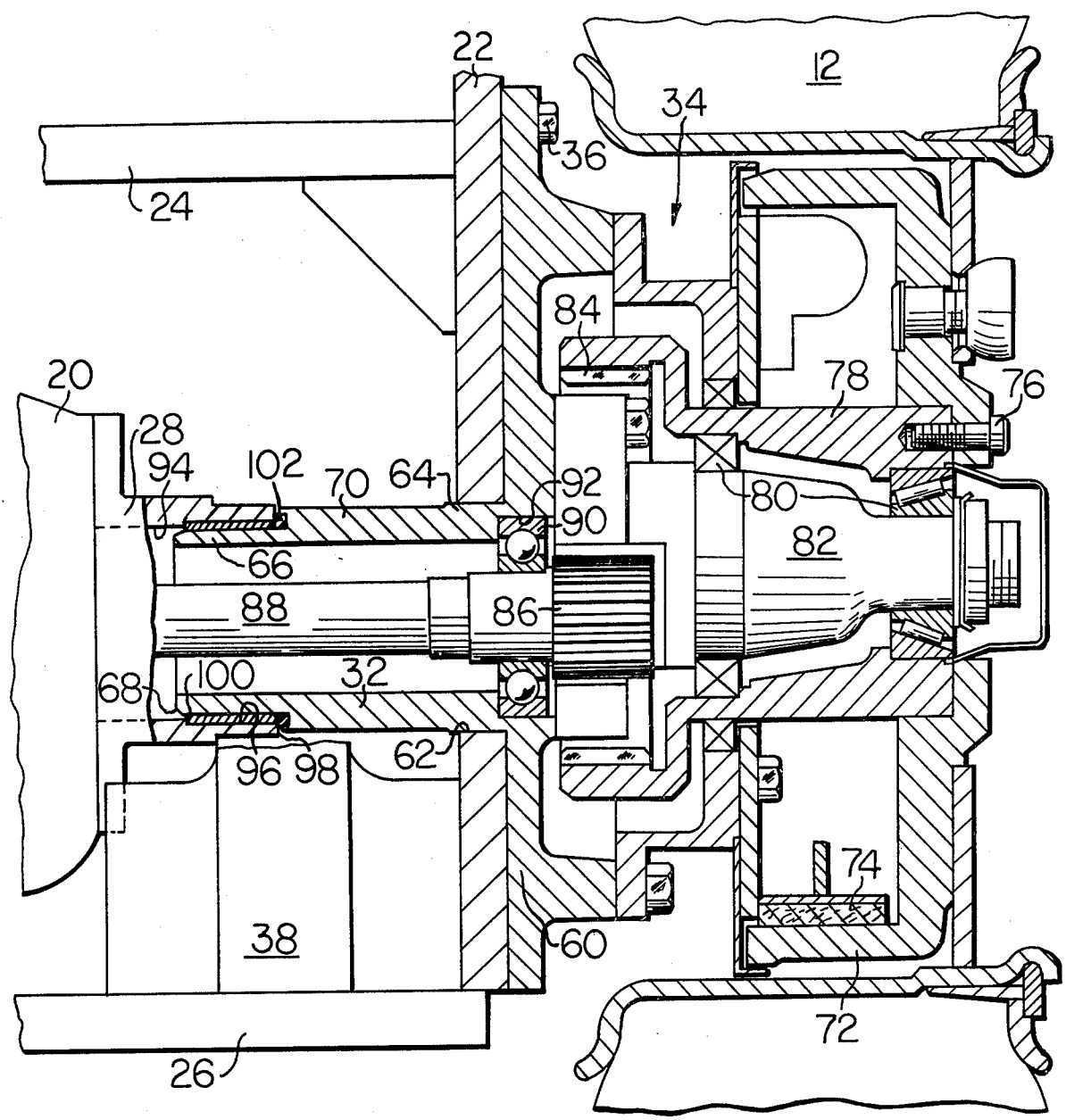
FIG. 4 is an enlarged, vertical section of a differential mounting made according to the invention.

An exemplary embodiment of a vehicle made according to the invention is illustrated in FIG. 1 in the form of a lift truck having a body or frame, generally designated 10, supported by ground engaging wheels 12 whereby the same may move over the underlying terrain. The front end 14 of the vehicle mounts a conventional mast 16 which, in turn, movably supports a fork or platform 18 for vertical movement in a conventional fashion. Conventional means (not shown) are also provided for tilting the mast 16 fore and aft about a generally horizontal axis.

Typically, the front wheels 12 of the vehicle will be driven by a motor or engine (not shown) connected to a differential 20 (FIG. 2) which is located between opposed, side frame members 22 extending along the length of the frame. The side frame members 22 are interconnected by upper and lower cross members 24 and 26, respectively.

The differential 20 is, of course, enclosed in a housing and the housing has oppositely extending, drive train component receiving tunnels 28 which are directed towards respective ones of the side frame members 22 as by bolts 36 or the like.

Because the final drive units 34 are secured to the side frames 22, loading on the wheels is not transmitted to the differential 20, that is, the housing for the differential 20 is not a load carrying member.

As seen in the Figures, at spaced locations adjacent each of the side frame members 22, the cross member 26 supports an upwardly extending, forwardly directed cradle 38. As best seen in FIGS. 1 and 3, the upper end 40 of the cradle extends forwardly of the body 10 and includes an upwardly opening hook formation 42 which is adapted to receive the end 44 of a shaft journalling ears 46 extending rearwardly from the mast 16. Thus, the hook formations 44 serve as a mounting means for mounting the mast 16 to the vehicle.

Each cradle has a rearwardly facing, diagonal surface 48 which is provided with a generally upwardly opening tunnel supporting surface 50. Each surface 50 has a shape substantially identical to the adjacent part of the differential tunnel 28 and may be slightly larger than the same so that a small gap 52 exists, as illustrated in FIG. 3. For the configuration of the tunnels illustrated in the drawings, the surface 50 will have the shape of a segment of a cylinder and an arcuate extent of less than 180°. It is also to be observed that the surface 50 extends to both sides of a vertical plane extending through the cylindrical axis of the surface, which axis is marked X in FIG. 3 to provide for retention of the differential therein.

FIG. 4 illustrates structural interrelationships between the differential 20 and the final drive 34 whereby the efficiency of assembly provided by the cradles 38 is maximized. Each final drive sleeve 32 is integrally formed as part of a mounting plate 60 by which the bolts 36 secure the final drive 34 to the corresponding side frame 22. Each sleeve 32 extends through an opening 62 in the side frame 22 and includes a maximum diameter section 64 immediately adjacent the mounting plate 60 sized to snugly fit within the opening 62. Remote from the maximum diameter section 64 is a minimum diameter section 66 which terminates in a generously tapered or chamfered end 68. Intermediate the sections 64 and 66 is a section 70 of a diameter just slightly less than that of the opening 62 to allow relatively free insertion of the sleeve 32 through the opening 62 for the vast majority of the length of the sleeve.

The final drive 34 includes a brake drum 72 and a brake shoe 74 which may be of conventional construction. Such elements are secured by bolts 76 to a hub 78 which is journalled by bearings 80 on a spindle or axle 82. The spindle 82 is secured by any suitable means to the mounting plate 60 with the consequence that loading on the vehicle is transmitted directly to the side frames 22 by the maximum diameter section 64 engaging the sides of the opening and the bolts 36. Thus, the drive components inwardly of the side frames 22 do not support vehicle load.

The hub 78 includes an internal ring gear 84 which is meshed with a spur gear 86 on the end of a shaft 88 extending to the differential 20 and connected to the drive components therein in a conventional fashion. Bearings 90 carried in a recess 92 in the mounting plate 60 serve to journal one end of the shaft 88.

Each differential tunnel 28, inwardly of its end, includes a section 94 having a diameter approximately equal to that of the minimum diameter section 66 of the sleeve 32. Immediately adjacent its end, each tunnel 28 includes a slightly enlarged diameter section 96 which terminates in an internal chamfered surface 98 on the end of the tunnel 28.

The various sections 66, 70, 94 and 96 are dimensioned with respect to each other so that the chamfer 68 on the sleeve 32 pilots the sleeve 32 into the interior of the tunnel 28 and, specifically, to the location illustrated in FIG. 4. The chamfer 98 serves a similar purpose. In order to ensure a good fit between the components and yet accommodate relative rotation of the tunnels 28 and the sleeves 32 as, for example, when the differential shifts due to torque, a bearing sleeve 100 is disposed on the minimum diameter section 66 of the sleeve 32 prior to its insertion into the tunnel 28. Preferably, a seal 102 is disposed at the shoulder defined by the intersection of the sections 66 and 70 on the sleeve 32 to seal the interface of the sleeve 32 and the tunnel 28.

From the foregoing, it will be appreciated that the provision of the cradles 38 minimizes the time required to perform the assembly operation of the final drives to the differential by reason of maintaining the differential on the frame in a position whereat assembly is facilitated. It will also be appreciated that the usefulness of the cradles 38 does not cease upon assembly due to their dual use as a permanent support for the mast 16. It will also be appreciated that the use of the chamfers 68 and 98 together with the relative dimensioning of the interfitting components at the interface of each sleeve 32 and the associated differential tunnel 28 pilots the components together during assembly with the cradles 38 permitting the minimal amount of movement necessary to achieve alignment and yet supporting the differential during the assembly process.

It will also be recognized that the foregoing means are not only useful at the time of initial assembly at the point of manufacture, but find further use where disassembly and reassembly may be required for servicing purposes.

Finally, it will be recognized that the lack of loading on the drive train components inwardly of the side frames maximizes their life.

The embodiments of the invention in which an exclusive property or privilege is claimed are defined as follows:

1. A lift truck comprising:
   means defining a vehicle frame including spaced side frame members;
   wheels on said frame including two final drive units, one on each side of the frame and secured thereto;
   a differential mounted on said frame and connected to both said final drive units, said differential including a housing having opposed, outwardly directed drive train component tunnels extending to a corresponding one of said final drive units; and
   a pair of cradles on opposite sides of said frame, each having a generally upwardly facing differential tunnel supporting surface, each said surface having substantially the same shape as the adjacent part of the corresponding tunnel and being slightly larger in size to support the differential during assembly while allowing minimal shifting thereof to achieve alignment of parts during assembly.

2. The lift truck of claim 1 wherein each said cradle further includes mast supporting means for supporting the mast of a lift truck.

3. The lift truck of claim 2 wherein said mast supporting means comprise a pair of upwardly opening hook formations, one on each cradle.

4. A vehicle, comprising:
   means defining a vehicle frame including spaced side frame members;
   ground engaging means on said frame including two final drive units, one on each side of the frame and secured thereto;
   a differential mounted on said frame and connected to both said final drive units, said differential including a housing having opposed, outwardly directed drive train component tunnels extending to a corresponding one of said final drive units; and
   a pair of upwardly directed cradles on opposite sides of said frame and spaced a distance less than the width of said housing, each having a generally upwardly facing differential tunnel supporting surface, each said surface being slightly larger in size than the adjacent part of the corresponding tunnel to support the differential during assembly while allowing minimal shifting thereof to achieve alignment of parts during assembly, each said surface further being a segment of a horizontal cylindrical surface formed in a diagonally extending side of said cradle, each said cylindrical surface extending to both sides of a vertical plane extending through the cylindrical axis of the corresponding cylindrical surface.

5. The vehicle of claim 4 wherein a portion of each said cradle projects forwardly of said frame and is provided with supporting means.

6. A vehicle according to claim 4 wherein said tunnels terminate in openings directed toward opposite sides of said vehicle, each said opening having an axially outer, slightly enlarged pilot bore extending to the end of the associated opening, said side frame members are spaced outwardly of said openings and have passages generally coaxial with said openings, and each said final drive unit includes an elongated pilot sleeve extending through the associated passage and into the corresponding opening, each said pilot sleeve having a diameter sized to snugly fit within the corresponding opening and a length sufficient to extend within the opening past the axially inner end of the corresponding pilot bore.

7. The vehicle of claim 6 wherein the axially outer portion of each said pilot sleeve is sized to be snugly received in the associated passage and the remainder of each said sleeve having at least a slightly reduced diameter.

8. The vehicle of claim 7 wherein the axially inner end of each said pilot sleeve includes a chamfer.

9. The vehicle of claim 7 wherein the axially inner end of each said pilot bore includes a chamfer.

10. The vehicle of claim 7 wherein the axially inner ends of one of said pilot sleeves and pilot bores includes a chamfer and the axially outer end of said opening includes a chamfer.

11. The vehicle of claim 10 further including sealing means between each said pilot sleeve and said housing.

* * * * *